Feb. 6, 1934.    D. F. KUMPMAN ET AL    1,945,646
HOT AND COLD WATER MIXING VALVE
Filed March 26, 1930    3 Sheets-Sheet 1

Inventor
Daniel F. Kumpman
By John E. Kumpman
Eccleston + Eccleston
Attorneys

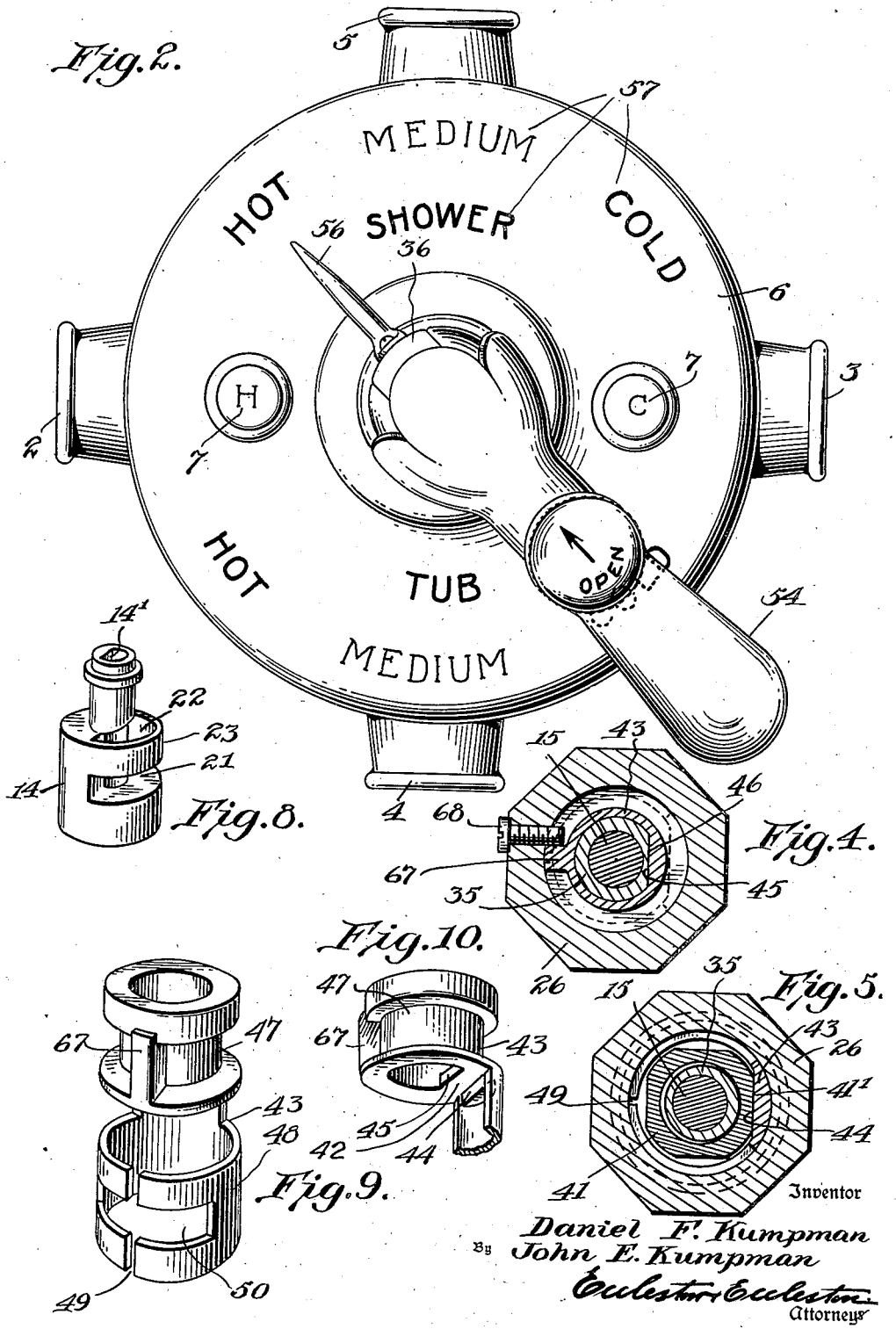

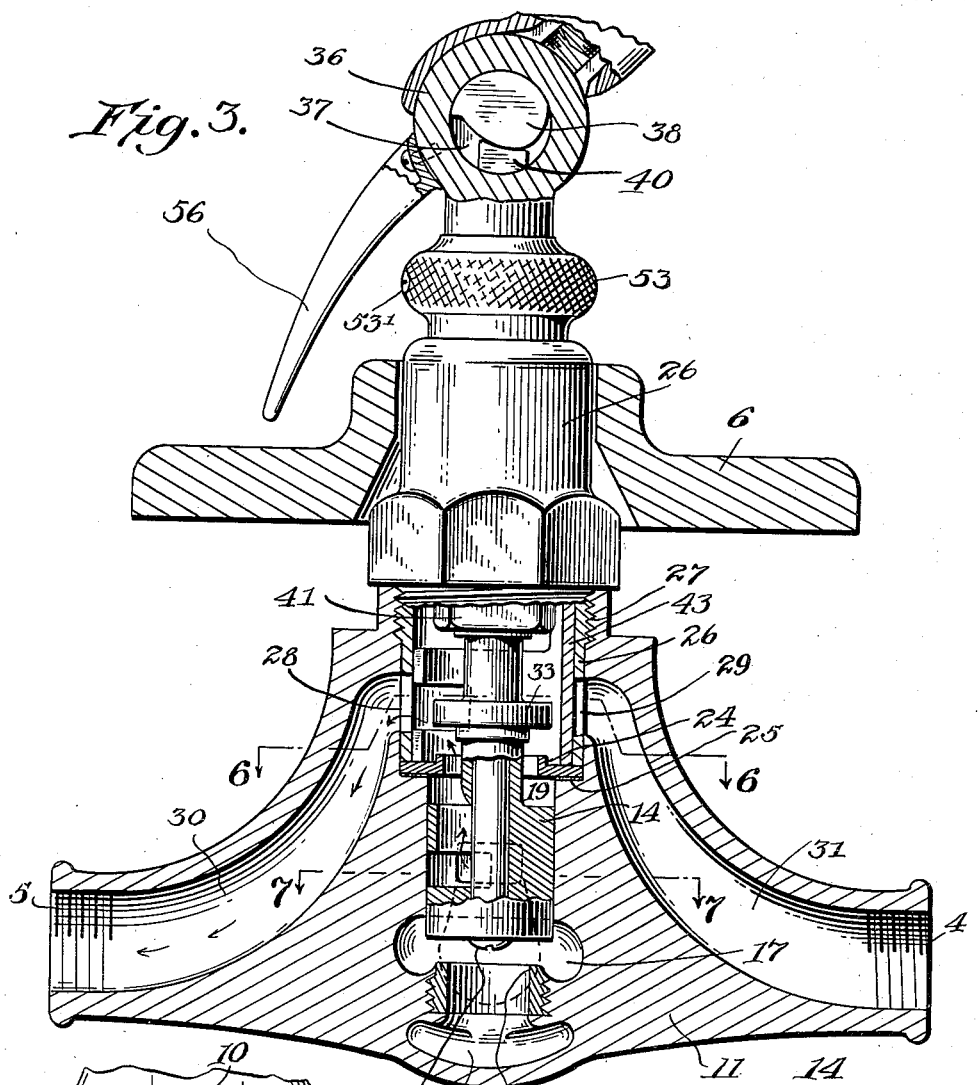
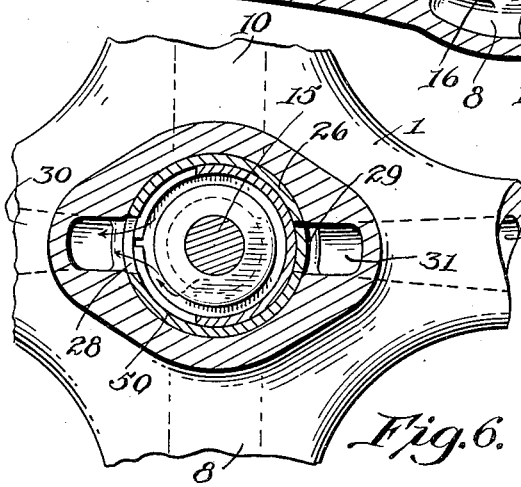
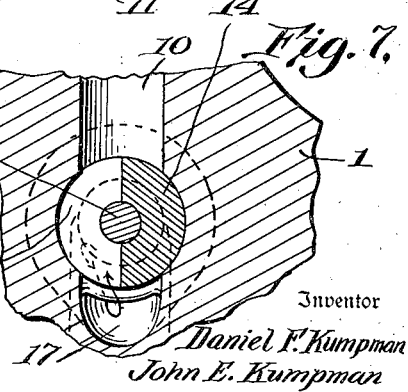

Patented Feb. 6, 1934

1,945,646

UNITED STATES PATENT OFFICE 1,945,646

HOT AND COLD WATER MIXING VALVE

Daniel F. Kumpman and John E. Kumpman, Dover, N. J.

Application March 26, 1930. Serial No. 439,178

3 Claims. (Cl. 277—1)

This invention relates to hot and cold water mixing valves of the general type shown in our co-pending application Serial No. 432,835, filed March 3, 1930; and has for its primary object to provide a single valve for use jointly with a bath tub and shower, shower stalls, or other installations requiring a two-way discharge of water; and providing such a valve which will permit this two-way use, and which will at the same time permit a mixing of the hot and cold water to give the desired temperature, and which will permit a volume control independently of the temperature. In accordance with this invention, a single valve controls the flow of water to a tub or to a shower, controls the temperature of the water to a tub or to a shower, and controls the volume of flow to a tub or to a shower independently of the temperature.

Numerous other objects and advantages of the invention will be apparent to those skilled in the art, from the following detailed description when taken in connection with the accompanying drawings; in which Figure 1 is a vertical longitudinal sectional view through the valve.

Figure 2 is a front elevational view thereof.

Figure 3 is a sectional view through the valve taken on line 3—3 of Figure 1, but with the handle and associated parts turned through 90°.

Figure 1:
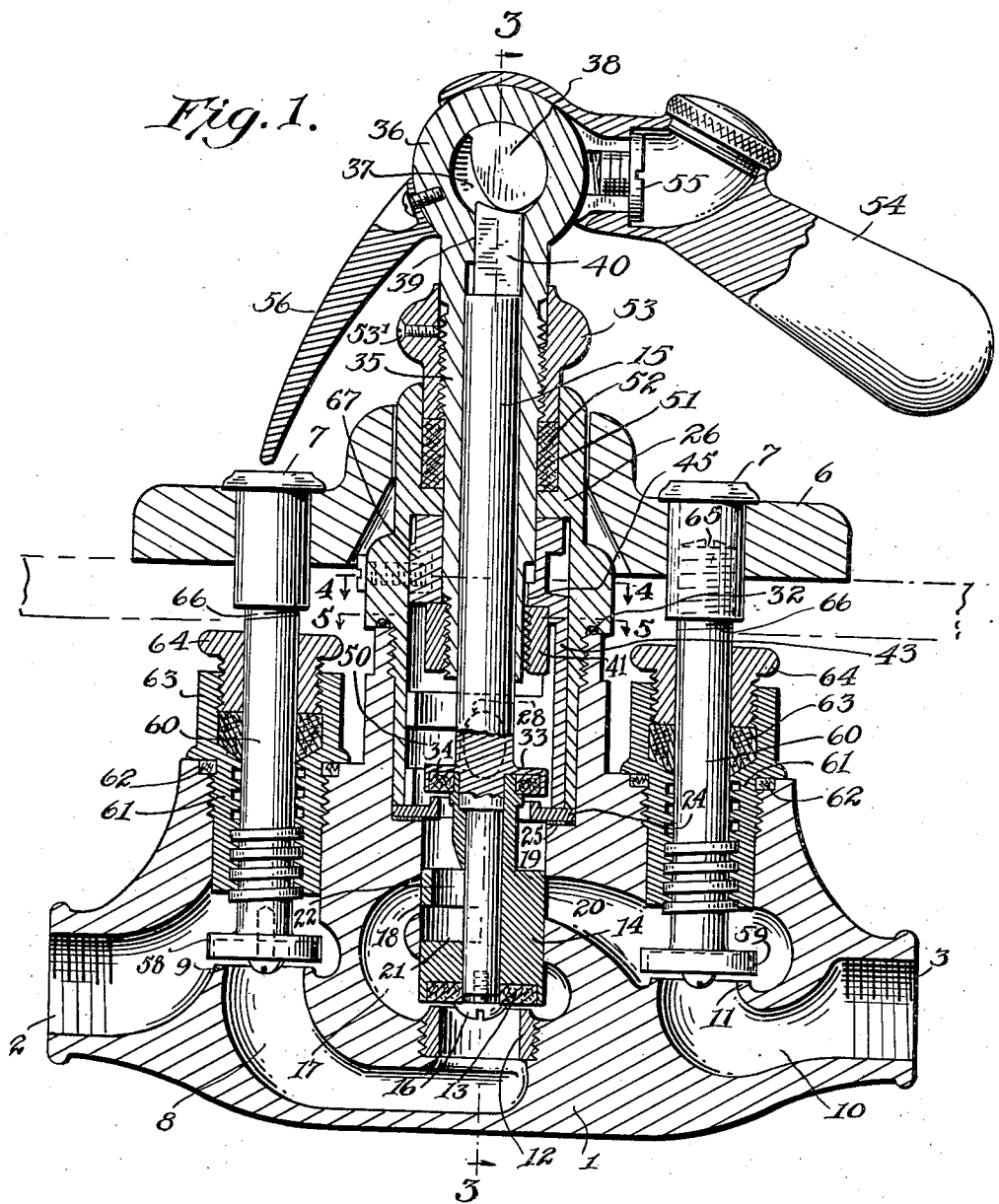

Figures 4 and 5 are sectional views taken on lines 4—4 and 5—5 respectively, of Figure 1.

Figures 6 and 7 are fragmentary sectional views taken on lines 6—6 and 7—7 respectively, of Figure 3.

Figure 8 is a perspective view of the main valve head.

Figure 9 is a perspective view of the transfer sleeve; and

Figure 10 is a similar view of a portion of said sleeve at a slightly different angle.

Referring to the drawings more specifically the numeral 1 indicates the valve casing or body which is provided with hot and cold water inlets 2 and 3 respectively, and discharge outlets 4 and 5 to the tub and shower respectively. An indicator plate 6 is preferably mounted on the panel in which the valve is mounted and stop caps 7 are employed for securing these parts to the panel as indicated in Figure 1.

In the hot water passage 8 leading from the inlet port 2 is a valve seat 9, while in the cold water passage 10 leading from inlet port 3 is a seat 11. The purpose and function of these valve seats and the valves for cooperating therewith will be referred to hereinafter.

A removable valve seat 12 is threaded into the inner end of the hot water passage 8 and a washer 13 is adapted to be moved to and from this seat for controlling the volume flow of hot water. The washer 13 is seated in the lower end of a valve head 14 and both the washer and valve head are secured to a valve stem 15 by means of a screw 16. A flattened portion 14′ of the valve head cooperates with a similar flattened portion on the stem 15 and thus prevents relative rotation between these parts. Leading from the seat 12 is a passage 17 terminating in a port 18 adapted to communicate with the central bore 19 of the valve casing upon proper manipulation of the valve stem. Likewise, the cold water passage 10 terminates in a port 20 adapted to communicate with the central bore 19.

The valve head 14 is provided with a substantially semi-circular slot or cut-out portion 21 and with a cut-out portion 22 communicating with the slot 21 and leaving a semi-circular band 23 which, in conjunction with the opposite part of the head, provides a circular band for closing the ports 18 and 20 when the valve head is in its lower position. When, however, the valve head is raised (Fig. 3) the cut-out portion 21 will come into more or less complete registration with either or both of the exit openings 18 and 20 of the respective passages 17 and 10. In this connection it is to be noted, as will be more specifically pointed out hereinafter, that the valve spindle 15 and head 14 are oscillatable about their longitudinal axis as well as reciprocable, and it will thus be apparent that by reason of the construction of the head 14 as just described and the compound movements referred to, the valve may be operated to allow the discharge of either hot water, cold water, or a mixture of any proportion of both, and in any desired volume.

Located in the enlarged upper portion of the bore 19 of the valve casing is a removable valve seat 24 disposed on a sealing gasket 25. This valve seat is pressed into sealing engagement with the valve body by means of a bonnet 26 which is threaded into the upper end of the valve body as indicated at 27, and is provided with a pair of diametrically opposed exit ports 28 and 29. Port 28 is adapted to communicate with a discharge passage 30 leading to a shower and port 29 is adapted to communicate with a passage 31 leading to a bathtub. A gasket 32 provides a seal between the bonnet and the body portion of the valve casing.

The seat 24 is what might be termed the master seat of the valve inasmuch as it cooperates with a valve head 33 carried by the spindle 15, and serves to prevent the entrance of both hot and cold water to the mixing chamber or enlarged part of the bore 19 when the head is moved to its lowermost position with its washer 34 in tight sealing contact with the seat. The lower valve seat 12 shuts off only the hot water, and its function is largely to prevent any intermingling of the hot and cold water which might be due to a differential in the cold and hot water pressures.

The valve stem 15 is reciprocably mounted within a cylindrical guide member 35 which terminates at its upper end in a head 36 provided with a circular opening 37 in which an oscillatable cam 38 is mounted. The head 36 is also provided with a substantially squared opening 39 through which projects the substantially squared upper end 40 of the valve stem 15. By this construction it will be apparent that the stem 15 will be rotated about its axis as the head 36 is rotated and that the stem will be depressed as the cam 38 is rotated in the proper direction. The valve stem 15 is raised by pressure of water on the washer 13, but this raising of the stem and the valve heads can occur only when the cam 38 is rotated to such position as will allow the upper end of the stem to rise in the opening 37 of the head 36.

As already intimated the guide member 35 is rotatably mounted within the valve bonnet 26, and in order to lock the same against longitudinal movement within the casing, a nut 41 is threaded onto the lower end of the guide and contacts with an inwardly projecting shoulder 42 on the water transfer sleeve 43 to be described. This nut is locked in its proper holding position by having one of its flattened faces 41' in contact with a flattened face 44 on the water transfer sleeve. Likewise, the transfer sleeve is held against rotation with respect to the guide member 35 by reason of a flattened portion 45 on the transfer sleeve contacting with a similar portion 46 on the guide member.

The transfer sleeve, which is shown in perspective in Figure 9, serves to selectively control the flow of water to the shower or to the tub. This member, in addition to its neck portion 47 is provided with a sleeve portion 48 which is split as indicated by numeral 49. The sleeve 48 is made of resilient metal and the slit 49 formed therein allows the sleeve to expand so as to provide a close fit with the inner wall of the bonnet 26 and seal off either or both of the ports 28 and 29. In this connection it is to be noted that the sleeve 48 is provided with an arcuate slot 50 of somewhat less than 180° in extent. Thus it will appear that by properly positioning this sleeve, either one or the other of the ports 28—29 may be opened while the other remains closed, or both ports may be closed simultaneously.

The bonnet 26 is provided with a stuffing box portion 51 in which is mounted packing material 52, and a packing nut 53 is threaded onto the tubular guide member 35 for the purpose of compacting this material; a set screw 53' securing the packing nut against accidental loosening.

In order to operate the cam 38 to control the vertical movements of the valve spindle 15, and for the purpose of rotating the valve spindle to properly position the valve head 14 and transfer sleeve 48, a handle 54 is provided. This handle is oscillatably attached to the head 36 by means of a screw 55 as described in the co-pending application above referred to. A pointer or indicator 56 is preferably secured to the head 36 and serves to cooperate with indicia 57 on the plate 6 to visually indicate the proportionate mixture of hot and cold water, to either the tub or shower.

It is desirable that some means be provided to prevent the valve from being inadvertently operated so as to shift the discharge of warm or hot water from the tub to the shower or vice versa, as for instance in an effort to obtain warmer water by a further turn of the handle 54. For this purpose a stop lug 67 is provided on the upper portion of the water transfer sleeve 43, and a stop screw 68 is threaded into the bonnet 26 for cooperation therewith. By this means it will be apparent that when hot water is running in either the tub or the shower it will be impossible to inadvertently shift from the one to the other in attempting to obtain hotter water; since the stops 67—68 would require that the handle be turned through substantially 180° before the transfer sleeve could be moved to a position to change the flow of water from the tub to the shower or vice versa.

By means of the construction hereinbefore described, it will be obvious that by pivotal movement of the handle 54 about the head 36 the cam 38 may be raised from engagement with the upper end 40 of the valve stem a variable extent, thus permitting the latter to rise by reason of the pressure of the hot water on the head 14; likewise, the stem is depressed as the lobe of the cam is swung downwardly. It will be obvious that through the medium of the squared portion 40 of the stem and the squared opening 39 of the guide member 35, these two elements rotate together, so that the valve heads 14 and 33 and water transfer sleeve 43 are rotatable by appropriate lateral movement of the handle; the angular position of the valve head 14 determining whether hot or cold water, or varying proportion of both, shall pass up through the bore. By reason of these two movements of the handle it will be apparent that the temperature of the flow and the volume of the flow, as well as the direction of discharge, may be fully controlled.

Valve seats 9 and 11 have been briefly referred to. These seats are intended for use in connection with valves 58 and 59 when it is desired to shut off the supply of water to the main valve for the purpose of repair or replacement. The valves 58—59 are identical and only one therefore, need be described. The valve stem 60 is threaded into a bushing or bonnet 61 which is in turn threaded into the valve body in alignment with the valve seat 9 or 11. A gasket 62 provides a seal between the bonnet and valve body 1; and packing 63 and packing nut 64 provide a seal for the valve stem 60. The upper or outer ends of the stems 60 are slotted, as indicated by numeral 65, to receive a screw driver or the like for rotating the valve to open or closed position. Also, the outer ends of the stems 60 are provided with threads 66 for receiving the caps 7, which as heretofore mentioned serve to anchor the parts to the fixture panel. In order to repair the main valve, therefore, it is only necessary that the caps 7 be removed, and the stems 60 be rotated so as to bring the valve heads 58—59 into sealing engagement with their seats 9 and 11. Thereafter, the valve head 14, stem 15, water transfer sleeve 43, etc., may be removed for the purpose of replacement or repair without liability of escape of water, and without the necessity of going to some other part of the room or building to shut off the main water supply.

The operation of the several parts of the structure have been fully described in connection with the detailed description of the parts themselves and repetition thereof is believed unnecessary. Suffice it to say that by a movement of the handle 54 toward or from the plate 6 a volume control of the flow of water, independent of its temperature, is provided; that by a lateral movement of the handle the temperature of the water is varied at will; and that the lateral movement of the handle also provides means for shifting the flow from the shower to the tub, or vice versa.

From the foregoing description taken in connection with the accompanying drawings it will be apparent to those skilled in the art that we have devised a simple construction of hot and cold water mixing valve having a selective discharge, that by the movement of a single handle the temperature, volume and direction of discharge of the water is fully controlled, that means are provided for preventing the inadvertent shifting of the water supply from tub to shower or vice versa, and that by the manipulation of auxiliary valves in the fixture itself both sources of supply may be shut off to permit the main operating parts of the control mechanism to be removed for repair or replacement.

In accordance with the patent statutes we have described what we now believe to be the best embodiment of the invention but we do not wish to be understood thereby as limiting ourselves or the scope of the invention, as many changes and modifications may be made without departing from the spirit of the invention; all such we aim to include in the scope of the appended claims.

What we claim as new and desire to secure by Letters Patent is:

1. A mixing valve including a casing having hot and cold water inlet passages and discharge passages leading to a shower and to a tub, a transfer sleeve in the casing for controlling the passages to the shower and tub, a valve head in the casing for controlling the mixture of hot and cold water, valves in the casing adapted to shut off the hot and cold water inlet passages to permit repairs, valve spindles for operating said valves, an indicator panel, and caps passing through the indicator panel and secured to said spindles.

2. A mixing valve including a casing having hot and cold water inlet passages, a discharge passage, a valve head in said casing, said valve head being rotatable to control the proportions of hot and cold water, said valve head being longitudinally movable to control the volume of the mixture without changing the proportions, valves in the hot and cold water passages for shutting off the flow to said valve head to permit repairs, spindles for operating said valves, a panel and caps passing through the panel and secured to said spindles.

3. A mixing valve including a casing having hot and cold water inlet passages, a discharge nozzle, a valve head for controlling the mixture of hot and cold water from said passages to said nozzle, a valve in each of said passages for shutting off the flow of water to the valve head for repair, spindles for operating said valves, a panel, caps for securing the panel in place, said caps being attached to the spindles, whereby the spindles are rendered accessible by removing the caps.

JOHN E. KUMPMAN.
DANIEL F. KUMPMAN.